(12) United States Patent  
Hande et al.

(10) Patent No.: US 10,787,863 B2  
(45) Date of Patent: Sep. 29, 2020

(54) THERMALLY INSULATED VERTICAL SUBSEA CONNECTION SYSTEM

(71) Applicant: Vetco Gray Scandinavia AS, Sandvika (NO)

(72) Inventors: Olav Hande, Sandvika (NO); Rolf Bastesen, Sandvika (NO); Anne-Beth Sandoy, Sandvika (NO); Roy-Petter Hestsveen, Sandvika (NO)

(73) Assignee: VETCO GRAY SCANDINAVIA AS, Sandvika (NO)

( * ) Notice: Subject to any disclaimer, the term of this patent is extended or adjusted under 35 U.S.C. 154(b) by 380 days.

(21) Appl. No.: 15/578,025

(22) PCT Filed: May 27, 2016

(86) PCT No.: PCT/EP2016/062006  
§ 371 (c)(1),  
(2) Date: Nov. 29, 2017

(87) PCT Pub. No.: WO2016/193146  
PCT Pub. Date: Dec. 8, 2016

(65) Prior Publication Data  
US 2018/0291694 A1   Oct. 11, 2018

(30) Foreign Application Priority Data  
May 29, 2015   (NO) .................................. 20150734

(51) Int. Cl.  
*E21B 17/04*   (2006.01)  
*E21B 36/00*   (2006.01)  
(Continued)

(52) U.S. Cl.  
CPC ............ *E21B 17/04* (2013.01); *E21B 36/003* (2013.01); *E21B 43/013* (2013.01); *F16L 1/26* (2013.01);  
(Continued)

(58) Field of Classification Search  
CPC ....... F16L 53/32; F16L 59/182; F16L 59/184; F16L 1/26; F16L 39/005; F16L 37/002; E21B 17/04; E21B 36/003; E21B 43/013  
(Continued)

(56) References Cited

U.S. PATENT DOCUMENTS 2,683,592 A * 7/1954 Birney .................... F16L 53/32  
285/41  
4,017,102 A * 4/1977 Henderson ............ F16L 39/005  
285/41

(Continued)

OTHER PUBLICATIONS

Office Action and Search issued in connection with corresponding NO Application No. 20150734 dated Dec. 21, 2015.  
(Continued)

*Primary Examiner* — Zachary T Dragicevich  
(74) *Attorney, Agent, or Firm* — Baker Hughes Patent Organization

(57) ABSTRACT

A vertical connection system for subsea connection of a first tubular member to a second tubular member, the system comprising a lower coupling member comprising an upright casing which encloses a liquid-filled space, wherein a hub of the first tubular member is fixed to the casing at an upper end thereof and the first tubular member extends through said space; and an upper coupling member, which comprises a guide frame configured to slidingly receive said casing when the upper coupling member is lowered downwards onto the lower coupling member, wherein a hub of the second tubular member is fixed to the upper coupling member. The guide frame is provided with a layer of thermally insulating material on its outside. The liquid-filled space is delimited downwards by a bottom wall formed by thermally insulating material or covered by a layer of thermally insulating material.

9 Claims, 3 Drawing Sheets

(51) Int. Cl.
*E21B 43/013* (2006.01)
*F16L 59/18* (2006.01)
*F16L 1/26* (2006.01)
*F16L 53/32* (2018.01)
*F16L 37/00* (2006.01)

(52) U.S. Cl.
CPC ............. *F16L 53/32* (2018.01); *F16L 59/182* (2013.01); *F16L 59/184* (2013.01); *F16L 37/002* (2013.01)

(58) Field of Classification Search
USPC ..................... 285/41, 47, 53, 121.1, 123.3
See application file for complete search history.

(56) References Cited

U.S. PATENT DOCUMENTS

| | | | |
|---|---|---|---|
| 4,108,476 A * | 8/1978 | Krupp | 285/47 |
| 5,423,575 A * | 6/1995 | Parks | 285/123.1 |
| 6,520,261 B1 | 2/2003 | Janoff et al. | |
| 8,807,224 B2 | 8/2014 | Hande et al. | |
| 2003/0010499 A1 | 1/2003 | Qvam et al. | |
| 2011/0042934 A1 | 2/2011 | Morck | |
| 2013/0199615 A1 | 8/2013 | McHugh et al. | |
| 2014/0290902 A1 | 10/2014 | Hande | |
| 2016/0245548 A1* | 8/2016 | Myerholtz, Jr. | F16L 53/32 |
| 2017/0074446 A1* | 3/2017 | Sumner | F16L 53/32 |

OTHER PUBLICATIONS

International Search Report and Written Opinion issued in connection with corresponding PCT Application No. PCT/EP2016/062006 dated Sep. 12, 2016.

International Preliminary Report on Patentability issued in connection with corresponding PCT Application No. PCT/EP2016/062006 dated Dec. 5, 2017.

* cited by examiner

THERMALLY INSULATED VERTICAL SUBSEA CONNECTION SYSTEM

BACKGROUND

In this description and the subsequent claims, a vertical connection system refers to a connection system where the coupling members of the connection system are mated in a substantially vertical direction.

In connection with oil and gas producing installations it is well known that rapid cooling of the production fluid during normal production and particularly during a temporary interruption of the production may result in the formation of hydrates, which may cause clogging of pipes and pipe connections. The cooling is caused by the ambient cold sea water. To delay cooling of the production fluid in case of an interruption of the production, some form of thermal insulation has to be provided to pipes and other elements through which the production fluid flows.

In a vertical connection system of the type disclosed in US 2011/0042934 A1, it is previously known to fill the internal space of the male-like lower coupling member with thermally insulating material in order to protect the part of the tubular member extending through this internal space from ambient cold sea water. Furthermore, the clamp connector which secures the hubs of the two tubular members to each other may be covered by a layer of thermally insulating material in order to protect the hubs from ambient cold sea water.

SUMMARY OF THE INVENTION

The object of the present invention is to achieve a vertical connection system of the above-mentioned type with improved thermal protection for the hubs of two tubular members which are connected to each other by means of the vertical connection system, to thereby provide a vertical connection system which is well-suited for use at great sea depths where the surrounding sea water has a very low temperature.

The vertical connection system of the present invention comprises: a male-like lower coupling member, which is to be fixed to a subsea structure and which comprises an elongated and upright casing which encloses an internal space, wherein a hub of a first tubular member is fixed to the casing at an upper end thereof and the first tubular member is arranged to extend vertically through said internal space from the upper end of the casing to a lower end thereof; and a female-like upper coupling member, which is configured for engagement with the lower coupling member by being lowered downwards onto it and which comprises a guide frame configured to slidingly receive the casing of the lower coupling member when the upper coupling member is lowered downwards onto the lower coupling member, wherein a hub of a second tubular member is fixed to the upper coupling member and wherein the upper coupling member comprises a connecting device for securing the hub of the first tubular member to the hub of the second tubular member when the upper coupling member has been landed onto the lower coupling member, wherein this vertical connection system is characterized in: that the guide frame is provided with a layer of thermally insulating material on its outside; that at least a major part of said internal space accommodates a liquid having heat-storing capacity, wherein an inner end of the hub of the first tubular member extends into the liquid-filled part of the internal space and is in contact with the liquid therein and a part of the first tubular member extends through the liquid-filled part of the internal space and is in contact with the liquid therein, so as to allow the liquid to delay cooling of the first tubular member and its hub by means of heat stored in the liquid; and that the liquid-filled part of said internal space is delimited downwards by a bottom wall which extends between the casing and the first tubular member and which is formed by thermally insulating material or covered by a layer of thermally insulating material.

The thermally insulating material on the outside of the guide frame of the female-like upper coupling member and the liquid enclosed in the casing of the male-like lower coupling member together form a thermal barrier between the first tubular member and the ambient sea water on the outside of the vertical connection system. The part of the first tubular member extending through the casing of the lower coupling member and the hubs of the first and second tubular members are protected from cooling too rapidly by means of heat stored in the liquid inside the casing. The liquid inside the casing is heated by heat emitted from the first tubular member during normal operation. This heat emanates from the production fluid flowing through the tubular members. If the heat input to the first tubular member from the production fluid is decreased or interrupted for some reason, the heat stored in the liquid inside the casing will slow down the cooling of the part of the first tubular member extending through the casing of the lower coupling member and the hubs of the first and second tubular members caused by the ambient cold sea water on the outside of the vertical connection system. In this case, heat will be transferred directly from said liquid to the hub of the first tubular member and also indirectly from said liquid to the hub of the first tubular member via the upper end of the first tubular member, and some of the heat received by the hub of the first tubular member will pass on from this hub to the hub of the second tubular member. The thermally insulated guide frame of the upper coupling member and the liquid-filled casing of the lower coupling member will together form a sort of heat bank. It has appeared that this heat bank will give a more efficient thermal protection for the hubs of the two tubular members as compared to the prior art solution with the casing of the lower coupling member filled with thermally insulating material.

BRIEF DESCRIPTION OF THE DRAWINGS

With reference to the appended drawings, a specific description of embodiments of the invention cited as examples follows below.

In the drawings.

DETAILED DESCRIPTION

Figure 1:
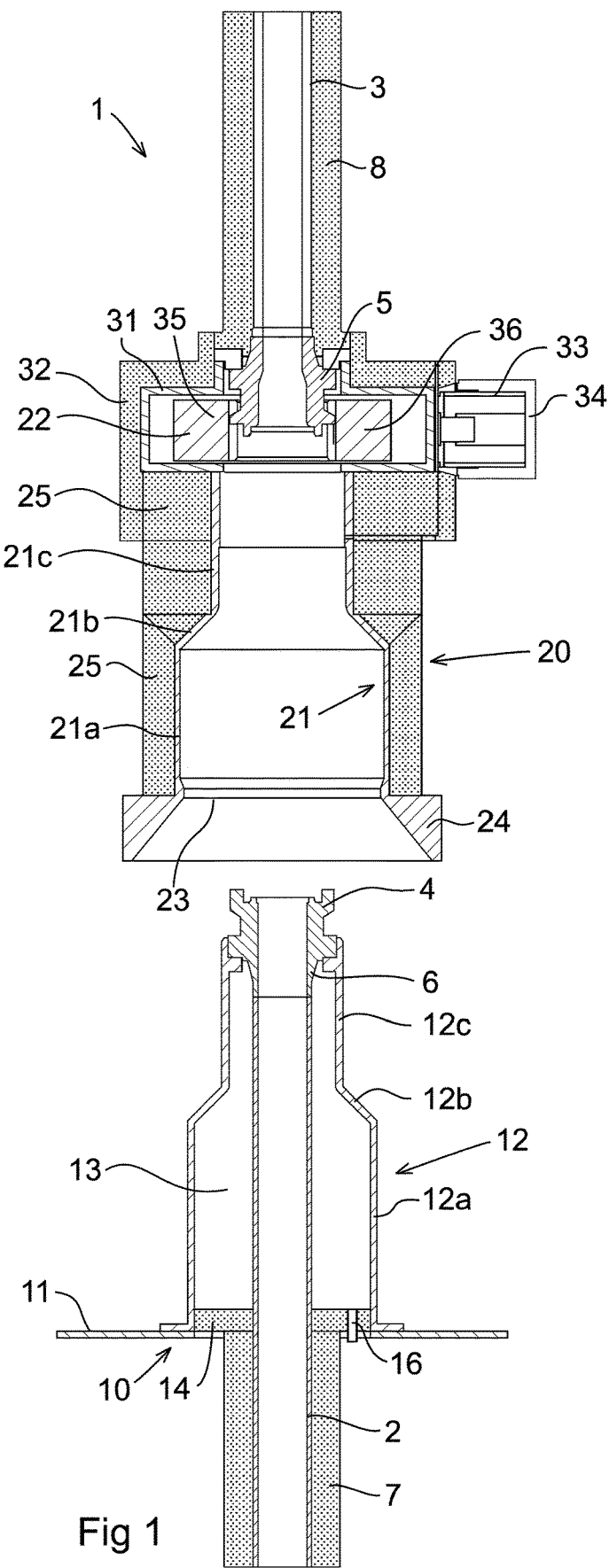
FIGS. 1 and 2 are longitudinal sections through an upper coupling member and a lower coupling member of a vertical connection system according to an embodiment of the present invention, with the upper coupling member illustrated in different positions during the connection of the upper coupling member to the lower coupling member.
Figure 2:
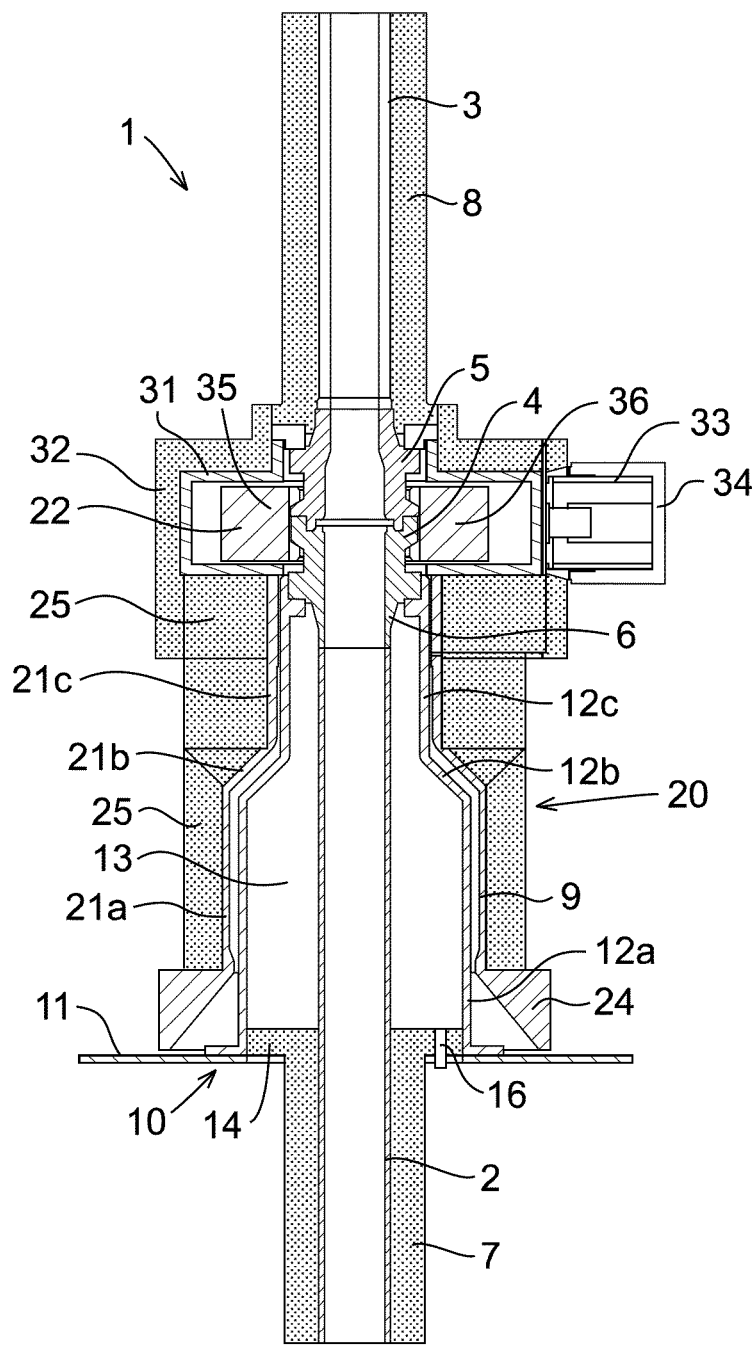

A vertical connection system 1 according to an embodiment of the present invention is illustrated in FIGS. 1 and 2. The vertical connection system 1 is to be used for subsea connection of a first tubular member 2 to a second tubular member 3, wherein the first tubular member 2 has an upwardly facing hub 4 at an upper end configured for engagement with a corresponding downwardly facing hub 5 at a lower end of the second tubular member 3.

In the illustrated example, the first tubular member 2 is a pup piece which for instance may be fixed to an end of a production fluid pipe or the similar, whereas the second tubular member 3 is another pup piece which for instance may be fixed to an end of a production flowline jumper or the similar. The first and second tubular members 2, 3 and the associated hubs 4, 5 are of metallic material, for instance stainless steel.

The vertical connection system 1 comprises a male-like lower coupling member 10, which is to be fixed to a subsea structure (not shown) via a horizontal base plate 11. The lower coupling member 10 comprises an elongated and upright casing 12 which projects vertically upwards from the base plate 11 and which encloses an internal space 13. The hub 4 of the first tubular member 2 is fixed to the casing 12 at an upper end thereof and the first tubular member 2 extends vertically through said internal space 13 from the upper end of the casing 12 to a lower end thereof. In the illustrated embodiment, the casing 12 comprises a cylindrical lower section 12A, a cylindrical upper section 12C and a conical intermediate section 12B located between the lower and upper sections 12A, 12C. The lower section 12A has a larger diameter than the upper section 12C, and the intermediate section 12B forms an inclined connecting surface between the lower end of the upper section 12C and the upper end of the lower section 12A.

The above-mentioned internal space 13 of the casing 12, or at least a major part thereof, accommodates a liquid having heat-storing capacity, in the form of sea water. An inner end 6 of the hub 4 of the first tubular member 2 extends into the liquid-filled part of the internal space 13 and is in contact with the liquid therein and a part of the first tubular member 2 extends through the liquid-filled part of the internal space 13 and is in contact with the liquid therein, so as to allow the liquid to delay cooling of the first tubular member 2 and its hub 4 by means of heat stored in the liquid accommodated in the internal space 13. The liquid-filled part of the internal space 13 is delimited downwards by a bottom wall 14 which extends between the casing 12 and the first tubular member 2 and which is formed by thermally insulating material or covered by a layer of thermally insulating material. In the illustrated embodiment, the bottom wall 14 is formed by a thermally insulating material which is impermeable to water. This thermally insulating material is for instance a material of the type marketed under the trademark ContraTherm®. As an alternative, the bottom wall 14 may be formed by a plate of stainless steel, or any other suitable material, covered by a layer of thermally insulating material. In order to maximize the volume of liquid accommodated in the internal space 13, the bottom wall 14 is arranged at the lower end of the lower section 12A of the casing.

A non-return valve 16 is with advantage arranged in the bottom wall 14, wherein this non-return valve 16 is configured to prevent liquid from flowing out into the surroundings from the internal space 13 of the casing 12, and to allow liquid to flow from the surroundings into the internal space 13 of the casing 12 when the external liquid pressure acting on the bottom wall 14 exceeds the pressure in the internal space 13 of the casing to a given extent. Thus, the non-return valve 16 will automatically open under the effect of the external hydrostatic pressure and thereby allow sea water to flow into the internal space 13 of the casing 12 when the lower coupling member 10 is lowered into the sea in order to be mounted to a subsea structure. Hereby, the internal space 13 is automatically filled with sea water. When sea water enters into the internal space 13 of the casing 12, air contained in this space 13 is allowed to escape into the surroundings through an air vent (not shown) or a non-airtight joint at an upper part of the casing 12. When the lower coupling member 10 has been mounted to the subsea structure, the non-return valve 16 will remain closed and thereby prevent liquid flow into or out of the internal space 13. The non-return valve 16 may for instance be a valve of the type disclosed in U.S. Pat. No. 8,807,224 B2.

The vertical connection system 1 further comprises a female-like upper coupling member 20 which is designed to mate with the lower coupling member 10. The upper coupling member 20 is configured to be engaged with the lower coupling member 10 by being lowered downwards onto it, as illustrated in FIGS. 1 and 2. The upper coupling member 20 comprises a guide frame 21 configured to slidingly receive the casing 12 of the lower coupling member 10 when the upper coupling member 20 is lowered downwards onto the lower coupling member 10. The hub 5 of the second tubular member 3 is fixed to the upper coupling member 20 and the upper coupling member 20 comprises a connecting device 22 for securing the hub 4 of the first tubular member 2 to the hub 5 of the second tubular member 3 when the upper coupling member 20 has been landed onto the lower coupling member 10. The connecting device 22 is a clamp connector.

The shape of the guide frame 21 is adapted to the shape of the casing 12 of the lower coupling member 10. In the illustrated embodiment, the guide frame 21 comprises a cylindrical lower section 21A, a cylindrical upper section 21C and a conical intermediate section 21b located between the lower and upper sections 21A 21C. The lower section 21A has a larger diameter than the upper section 21C, and the intermediate section 21B forms an inclined connecting surface between the lower end of the upper section 21C and the upper end of the lower section 21A. The lower section 21A of the guide frame 21 is configured to receive the lower section 12A of the casing 12 and has an inner diameter which is somewhat larger than the outer diameter of the lower section 12A of the casing 12, whereas the upper section 21C of the guide frame 21 is configured to receive the upper section 12C of the casing 12 and has an inner diameter which is somewhat larger than the outer diameter of the upper section 12C of the casing 12.

An opening 23 is provided at the lower end of the guide frame 21 in order to allow the guide frame 21 to be lowered downwards onto the casing 12 of the lower coupling member 10. Inclined guide members 24 are with advantage provided at this opening 23 in order to guide the upper coupling member 20 onto the lower coupling member 10 when the upper coupling member 20 is lowered downwards into contact with the lower coupling member 10.

The guide frame 21 is provided with a layer 25 of thermally insulating material on its outside, wherein the outer surface of the guide frame 21 is completely or at least partly covered by thermally insulating material. In the illustrated embodiment, the whole outer surface of the guide frame 21 is covered by thermally insulating material which is fixed to the guide frame.

The thermally insulating material fixed to the outside of the guide frame 21 is for instance a material of the type marketed under the trademark ContraTherm®. The part of the first tubular member 2 extending downwards from the bottom wall 14 and the second tubular member 3 may also be covered by a layer 7, 8 of thermally insulating material of this type.

The connecting device 22 is enclosed in a casing 31 which is provided with a layer 32 of thermally insulating material on its outside. The thermally insulating material fixed to the outside of the casing 31 is for instance a material of the type marketed under the trademark ContraTherm®. The free space inside the casing 31 between the connecting device 22 and the inner walls of the casing 31 may be filled with sea water.

In the illustrated embodiment, the connecting device 22 is a clamp connector and comprises a torque bucket 33, wherein this torque bucket 33 may be covered by a releasable cap 34 which is formed by thermally insulating material or covered by a layer of thermally insulating material.

Different steps in a process of connecting an end of a first tubular member 2 to an end of a second tubular member 3 by means of a vertical connection system 1 of the type described above are illustrated in FIGS. 1 and 2.

The lower coupling member 10 is mounted to a subsea structure via the base plate 11 with the casing 12 extending vertically upwards from the base plate 11, and the hub 4 of the first tubular member 2 is fixed to the casing 12. The inner space 13 of the casing 12 has been filled with sea water via the non-return valve 16 when the lower coupling member 10 has been lowered downwards into engagement with the subsea structure. The hub 5 of the second tubular member 3 is fixed to the upper coupling member 20 before this coupling member is lowered into the sea. The upper coupling member 20 is then lowered into the sea, e.g. from a surface vessel, while hanging in a crane hook of a hoisting device through lifting wires (not shown) attached to the upper coupling member 20. The guide frame 21 of the upper coupling member 20 is moved down onto the casing 12 of the lower coupling member 10 and made to slide downwards along the different sections 12A-12C of the casing 12, until the hub 5 of the second tubular member 3 abuts against the hub 4 of the first tubular member 2. The guide frame 21 and the casing 12 are so adapted to each other that the hubs 4, 5 are properly aligned with each other when the upper coupling member 20 has been landed onto the lower coupling member 10. A remotely operated torque tool (not shown), which is detachably connected to the torque bucket 33, is then operated to move clamping elements 35, 36 of the connecting device 22 into a clamping position so as to thereby clamp together the hub 4 of the first tubular member 2 and the hub 5 of the second tubular member 3. The torque tool may then be released from the torque bucket 33, whereupon the cap 34 is mounted to the torque bucket 33. When the upper coupling member 20 is lowered into the sea and brought into engagement with the lower coupling member 10, sea water will enter into the casing 31 of the connecting device 22 and will also enter into the interspace 9 between the casing 12 of the lower coupling member 10 and the guide frame 21 of the upper coupling member 20.

The sea water inside the casing 12 of the lower coupling member 10 is heated by heat emitted from the first tubular member 2 and its hub 4 during normal operation. This heat emanates from the production fluid flowing through the tubular members 2, 3. If the heat input to the first tubular member 2 from the production fluid is decreased or interrupted for some reason, the heat stored in the sea water inside the casing 12 will slow down the cooling of the hubs 4, 5 and the cooling of the part of the first tubular member 2 extending through the casing 12 of the lower coupling member caused by the ambient cold sea water on the outside of the vertical connection system 1. Thus, by means of heat stored in the sea water inside the casing 12, the hubs 4, 5 and said part of the first tubular member 2 are protected from cooling too rapidly.

The casing 12 of the lower coupling member 10 and the guide frame 21 of the upper coupling member 20 may of course also have other designs than here illustrated.

Figure 3:
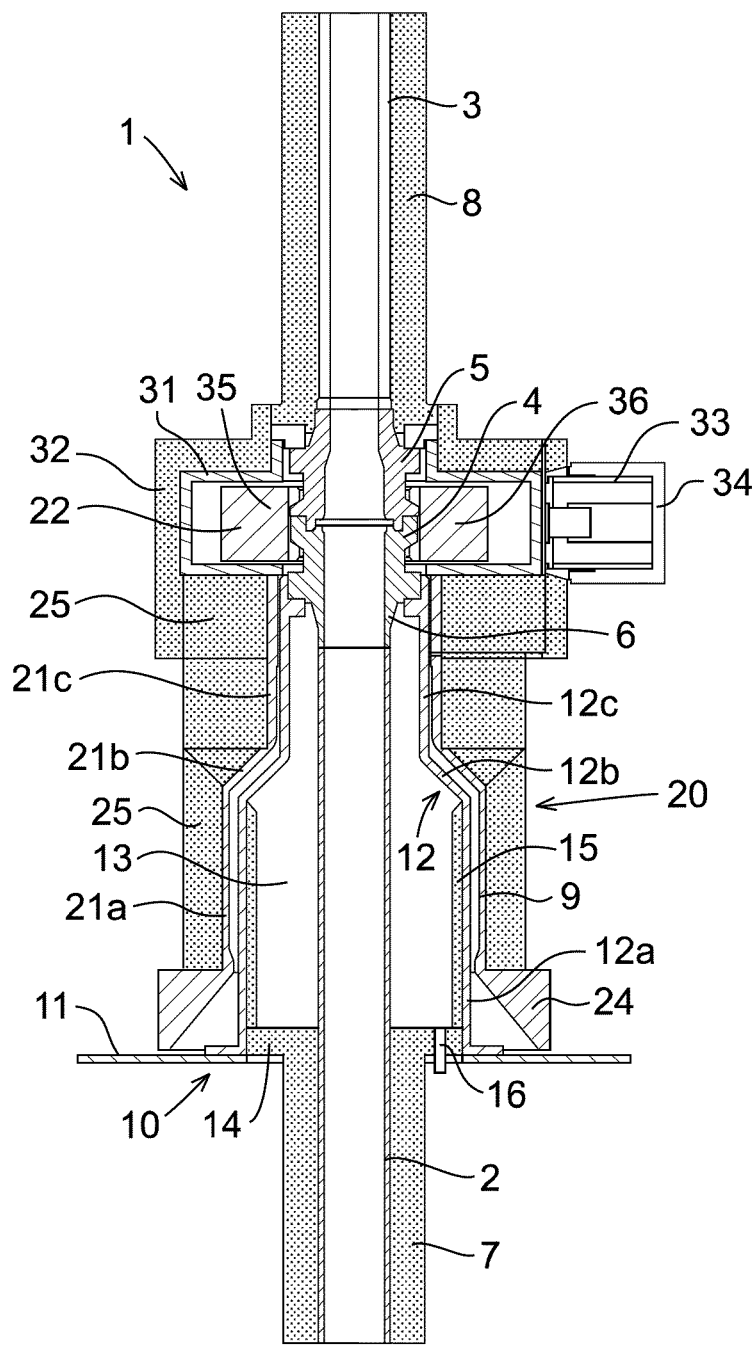
FIG. 3 is a longitudinal section through an upper coupling member and a lower coupling member of a vertical connection system according to another embodiment of the invention.

In the embodiment illustrated in FIG. 3, the lower section 12A of the casing 12 is covered by a layer 15 of thermally insulating material on its inner side. Also the intermediate section 12B and/or the upper section 12C of the casing 12 could be covered by a layer of thermally insulating material on its inner side. As to the rest, the embodiment illustrated in FIG. 3 corresponds to the embodiment illustrated in FIGS. 1 and 2 which has been described above.

The invention is of course not in any way restricted to the embodiments described above. On the contrary, many possibilities to modifications thereof will be apparent to a person with ordinary skill in the art without departing from the basic idea of the invention such as defined in the appended claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A vertical connection system for subsea connection of two tubular members of a subsea structure, the system comprising:
   a male-like lower coupling member comprising an elongated and upright casing enclosing an internal space, the casing having an upper end and a lower end, the upper end configured to be fixed to a hub of a first tubular member of the subsea structure such that the first tubular member extends vertically through the internal space from the upper end of the casing to the lower end; and
   a female-like upper coupling member comprising a guide frame comprising a layer of thermally insulating material on its outside, the guide frame configured to slidingly receive the casing of the lower coupling member when the upper coupling member is lowered onto the lower coupling member, the upper coupling member further configured to be fixed to a hub of a second tubular member of the subsea structure, the upper coupling member comprising a connecting device configured to secure the hub of the first tubular member to a hub of the second tubular member when the upper coupling member has been landed onto the lower coupling member,
   wherein the internal space comprises a liquid-filled portion accommodating a liquid having heat-storing capacity, the internal space configured to receive an inner end of the hub of the first tubular member within the liquid-filled portion so that a part of the first tubular member extends through the liquid-filled portion and is in contact with the liquid so that heat stored in the liquid delays cooling of the first tubular member and its hub, and wherein the liquid-filled portion is delimited downward by a bottom wall extending between the casing and the first tubular member, the bottom wall formed by a thermally insulating material impermeable to water.

2. A vertical connection system according to claim 1, wherein the casing is at least partly covered by a layer of thermally insulating material on its inner side.

3. A vertical connection system according to claim 1, wherein the liquid is sea water.

4. A vertical connection system for subsea connection of two tubular members of a subsea structure, the system comprising:
   a male-like lower coupling member comprising an elongated and upright casing enclosing an internal space, the casing having an upper end and a lower end, the upper end configured to be fixed to a hub of a first tubular member of the subsea structure such that the first tubular member extends vertically through the internal space from the upper end of the casing to the lower end;
   a female-like upper coupling member comprising a guide frame comprising a layer of thermally insulating material on its outside, the guide frame configured to slidingly receive the casing of the lower coupling member when the upper coupling member is lowered onto the lower coupling member, the upper coupling member further configured to be fixed to a hub of a second tubular member of the subsea structure, the upper coupling member comprising a connecting device configured to secure the hub of the first tubular member to a hub of the second tubular member when the upper coupling member has been landed onto the lower coupling member;
   the internal space comprising a liquid-filled portion accommodating a liquid having heat-storing capacity, the internal space configured to receive an inner end of the hub of the first tubular member within the liquid-filled portion so that a part of the first tubular member extends through the liquid-filled portion and is in contact with the liquid so that heat stored in the liquid delays cooling of the first tubular member and its hub, wherein the liquid-filled portion is delimited downward by a bottom wall extending between the casing and the first tubular member, the bottom covered by a layer of thermally insulating material, or formed from a thermally insulating material; and
   a non-return valve arranged in the bottom wall, the non-return valve configured to prevent liquid from flowing out into the surroundings from the internal space of the casing but allow liquid to flow from the surroundings into the internal space of the casing when the external liquid pressure acting on the bottom wall exceeds a pressure in the internal space of the casing.

5. A vertical connection system according to claim 4, wherein the casing is at least partly covered by a layer of thermally insulating material on its inner side.

6. A vertical connection system according to claim 4, wherein the liquid is sea water.

7. A vertical connection system for subsea connection of two tubular members of a subsea structure, the system comprising:
   a male-like lower coupling member comprising an elongated and upright casing enclosing an internal space, the casing having an upper end and a lower end, the upper end configured to be fixed to a hub of a first tubular member of the subsea structure such that the first tubular member extends vertically through the internal space from the upper end of the casing to the lower end;
   a female-like upper coupling member comprising a guide frame comprising a layer of thermally insulating material on its outside, the guide frame configured to slidingly receive the casing of the lower coupling member when the upper coupling member is lowered onto the lower coupling member, the upper coupling member further configured to be fixed to a hub of a second tubular member of the subsea structure, the upper coupling member comprising a connecting device configured to secure the hub of the first tubular member to a hub of the second tubular member when the upper coupling member has been landed onto the lower coupling member; and
   the internal space comprising a liquid-filled portion accommodating a liquid having heat-storing capacity, the internal space configured to receive an inner end of the hub of the first tubular member within the liquid-filled portion so that a part of the first tubular member extends through the liquid-filled portion and is in contact with the liquid so that heat stored in the liquid delays cooling of the first tubular member and its hub, wherein the liquid-filled portion is delimited downward by a bottom wall extending between the casing and the first tubular member, the bottom covered by a layer of thermally insulating material, or formed from a thermally insulating material,
   wherein the connecting device is a clamp connector.

8. A vertical connection system according to claim 7, wherein the casing is at least partly covered by a layer of thermally insulating material on its inner side.

9. A vertical connection system according to claim 7, wherein the liquid is sea water.

* * * * *